United States Patent [19]
Cuevas

[11] Patent Number: 4,907,819
[45] Date of Patent: Mar. 13, 1990

[54] LIGHTWEIGHT NON-WELDED GAS GENERATOR WITH ROLLED SPUN LIP

[75] Inventor: Jess Cuevas, Scottsdale, Ariz.

[73] Assignee: Talley Automotive Products, Inc., Mesa, Ariz.

[21] Appl. No.: 246,065

[22] Filed: Sep. 16, 1988

[51] Int. Cl.⁴ .................. B60R 21/16; B60R 21/26
[52] U.S. Cl. .................................. 280/736; 280/741; 280/743
[58] Field of Search ............... 280/731, 736, 728, 730, 280/739, 741, 743; 422/166, 165; 137/68.2; 29/421.2

[56] References Cited

U.S. PATENT DOCUMENTS

| | | | |
|---|---|---|---|
| 1,268,550 | 6/1918 | Dunlap | 220/320 |
| 2,060,145 | 11/1930 | Vogel | 113/19 |
| 2,379,053 | 6/1945 | Weingart | 220/82 |
| 2,779,281 | 1/1957 | Maurice et al. | 102/39 |
| 3,117,424 | 1/1964 | Heberstreit | 62/48 |
| 3,303,560 | 2/1967 | Lansky et al. | 29/421 |
| 3,411,808 | 11/1968 | Chute | 280/150 |
| 3,413,013 | 11/1968 | Wissing et al. | 280/150 |
| 3,558,285 | 1/1971 | Ciccone et al. | 23/281 |
| 3,580,603 | 5/1971 | Chute | 280/150 |
| 3,618,976 | 11/1971 | Leising | 280/150 |
| 3,618,980 | 11/1971 | Leising | 280/150 |
| 3,624,810 | 11/1971 | Hass | 280/150 |
| 3,630,472 | 12/1971 | Axenborg | 244/122 |
| 3,666,289 | 5/1972 | Magyar | 280/150 |
| 3,674,059 | 7/1972 | Stephenson | 141/4 |
| 3,727,942 | 4/1973 | Arntson | 280/150 |
| 3,752,500 | 8/1973 | Culver | 280/150 |
| 3,770,387 | 11/1973 | Loomba | 23/281 |
| 3,777,772 | 12/1973 | Arnold et al. | 137/68 |
| 3,784,223 | 1/1974 | Hass et al. | 280/150 |
| 3,785,674 | 1/1974 | Poole et al. | 280/150 |
| 3,786,843 | 1/1974 | Stephenson et al. | 141/13 |
| 3,794,346 | 2/1974 | Brockman et al. | 280/150 |
| 3,797,854 | 3/1974 | Poole et al. | 280/150 |
| 3,805,569 | 4/1974 | Chartet | 72/56 |
| 3,819,203 | 6/1974 | Radke et al. | 280/150 |
| 3,819,205 | 6/1974 | Dunford et al. | 280/150 |
| 3,822,895 | 7/1974 | Ochiai | 280/150 |
| 3,831,973 | 8/1974 | Meacham | 280/150 |
| 3,834,729 | 9/1974 | Oka et al. | 280/150 |

(List continued on next page.)

FOREIGN PATENT DOCUMENTS

| | | | |
|---|---|---|---|
| 12626 | 6/1980 | European Pat. Off. | 280/736 |
| 2330194 | 2/1974 | Fed. Rep. of Germany. | |
| 445318 | 10/1967 | Switzerland. | |
| 1359567 | 5/1973 | United Kingdom. | |
| 1388697 | 5/1973 | United Kingdom. | |

Primary Examiner—Richard A. Bertsch
Attorney, Agent, or Firm—Pennie & Edmonds

[57] ABSTRACT

A non-welded pyrotechnic gas-generating inflator apparatus which comprises: a domed diffuser member, open at one end; a closure plate member sealing the open end of the diffuser member, the members being mechanically sealed by rolling a peripheral lip portion of the diffuser member over the outer circumference edge of the closure plate member at an angle of about 180 degrees to a remaining lateral wall portion of the diffuser member, and inserting a locking ring member against a bottom surface of the closure member within the periphery of the rolled lip, the locking ring being configured to engage an inner terminal edge portion of the lip, thereby forming a sealed inflator housing; a sufficient amount of a combustible gas generant material within said housing to produce, upon the combustion thereof, a volume of a gaseous product sufficient to substantially inflate an automobile air bag within about 30–60 milliseconds; a combustion initiating device positioned within the housing adjacent the gas generant and a filter assembly for filtering the combustion product prior to its discharge from the inflator, the filter assembly circumferentially surrounding the gas generant within the housing. In fabricating the inflator, the filter assembly is simply lowered into position within the diffuser and the propellant is lowered into the filter cavity. Subsequently, the closure member is mated to the open end of the diffuser and the lip of the diffuser is rolled over the outer edge of the closure by a rotating mechanical head in the area where they overlap to form a seal therebetween.

37 Claims, 4 Drawing Sheets

U.S. PATENT DOCUMENTS

| | | | |
|---|---|---|---|
| 3,843,152 | 10/1974 | Nonaka | 280/150 |
| 3,856,180 | 12/1974 | Merrell | 222/5 |
| 3,856,181 | 12/1974 | Merrell | 222/5 |
| 3,862,767 | 1/1975 | Chute | 280/150 |
| 3,865,273 | 2/1975 | Zeigler | 222/5 |
| 3,868,124 | 2/1975 | Johnson | 280/150 |
| 3,869,143 | 3/1975 | Merrell | 280/150 |
| 3,871,684 | 3/1975 | Staudacher et al. | 280/150 |
| 3,874,693 | 4/1975 | Patzelt et al. | 280/150 |
| 3,877,882 | 4/1975 | Lette et al. | 23/281 |
| 3,880,447 | 4/1975 | Thorn et al. | 280/150 |
| 3,887,215 | 6/1975 | Albrecht et al. | 280/150 |
| 3,895,823 | 7/1975 | Stephenson | 280/150 |
| 3,904,221 | 9/1975 | Shiki et al. | 280/150 |
| 3,907,330 | 9/1975 | Kondo et al. | 280/150 |
| 3,909,037 | 9/1975 | Stewart | 280/150 |
| 3,910,595 | 10/1975 | Katter et al. | 280/150 |
| 3,910,596 | 10/1975 | Wulbrecht et al. | 280/150 |
| 3,934,984 | 1/1976 | Marlow et al. | 23/281 |
| 3,938,824 | 2/1976 | Patzelt | 280/150 |
| 3,944,250 | 3/1976 | Wolf et al. | 280/150 |
| 3,944,769 | 3/1976 | Wagner | 200/83 |
| 3,958,949 | 5/1976 | Planitif et al. | 23/281 |
| 3,966,226 | 6/1976 | Roth | 280/737 |
| 3,968,980 | 7/1976 | Hay | 280/734 |
| 4,018,457 | 4/1977 | Marlow | 280/735 |
| 4,068,862 | 1/1978 | Ishi et al. | 280/740 |
| 4,131,299 | 12/1978 | Ono et al. | 280/736 |
| 4,131,300 | 12/1978 | Radke et al. | 280/737 |
| 4,153,273 | 5/1979 | Risko | 280/740 |
| 4,158,696 | 6/1979 | Wilhelm | 280/736 |
| 4,296,084 | 10/1981 | Adams et al. | 423/351 |
| 4,394,033 | 7/1983 | Goetz et al. | 280/376 |
| 4,547,342 | 10/1985 | Adams et al. | 422/166 |
| 4,561,675 | 12/1985 | Adams et al. | 280/734 |
| 4,711,466 | 12/1987 | Breed | 280/741 |
| 4,722,551 | 2/1988 | Adams | 280/736 |
| 4,734,265 | 3/1988 | Nilsson et al. | 422/165 |

# LIGHTWEIGHT NON-WELDED GAS GENERATOR WITH ROLLED SPUN LIP

TECHNICAL FIELD

The invention relates to automobile passive restraint safety devices and more particularly, to a lightweight pyrotechnic gas generator unit for inflating automobile air bags, wherein the unit is joined without the use of welds and/or rivets.

BACKGROUND OF THE INVENTION

Large numbers of people are killed or injured annually in automobile accidents wherein the driver and/or passengers are thrown forward so as to impact against solid surfaces within the vehicle. There has thus been considerable impetus toward development of passive restraint systems for use with these vehicles. One system which has been extensively investigated senses rapid deceleration of the vehicle such as that which occurs upon a primary impact between an automobile and, for example, another car. This system thus initiates inflation of a bag between the interior surface of the car and the vehicle occupant prior to the occurrence of any secondary collision between the driver and/or passengers and the interior of the car. Inflation of the bag must therefore occur within milliseconds of the primary impact, in order to restrain any occupants before they are injured due to secondary collisions against the solid surfaces within the vehicle.

Moreover, it is further desirable to deflate the bag as soon as the impact of a crash is completed, so that the occupant is not trapped within the vehicle by an inflated bag. It is also necessary to deflate the bag rapidly so that, in case of accidental inflation, the restraint upon the person driving the automobile is sufficiently short that they do not lose control of the vehicle. In order to meet such criteria, specifications have been established whereby a bag should be inflated sufficiently to restrain an occupant in about 30-60 milliseconds after initiation, with substantial deflation occurring after about 100 milliseconds.

One of the problems with providing such a passive restraint system for protecting the driver of the automobile during a crash is how to arrange and position the device upon the steering column. For reasons of styling and consumer acceptance, as well as not interfering with the driver's movement or vision of the instrument panel, and so as not to degrade the vehicle,s steering dynamics, it is desirable to arrange the crash restraint apparatus as conveniently as possible, and yet have it positioned so that it effectively accomplishes its intended protective function. Further, since an inflating device for such a crash restraint system must be capable of discharging a relatively large volume of gas in a very short period of time (e.g., 30-60 milliseconds), there are safety considerations not only in the deployment of the inflator within the automobile, but also with regard to handling, installing, replacing and repairing such inflating devices.

In addition, in the particular case of a driver's side, i.e., steering wheel, installation, the utilization of an inflator apparatus with a low weight is important for several reasons. First, the wheel assembly is in a cantilevered position at the end of the steering column. Therefore, the additional weight placed upon the wheel assembly can cause excessive column whip attributable to vertical accelerations due to road shocks (e.g., bumps or chuckholes) which can lead to degraded, or possibly a loss, of driver control. Secondly, if for reasons such as styling or driver vision line clearance, the inflator is required to be located asymmetrically with respect to the steering column centerline, any excessive weight attributable to this device will create resistive wheel turning torque, thus degrading the rotational dynamics of the steering assembly and providing potential for loss of driver control or other unusual or undesirable vehicle handling "feel" under certain driving conditions.

Moreover, the recent emphasis on weight reduction for the purpose of fuel conservation in motorized vehicles, has created a need and a demand for a lighter weight inflation system. This is of particular importance in a crash protection system for the driver wherein the inflator is mounted on the vehicle's steering wheel as discussed above. The availability of a lighter weight inflator for installation at this location further enables a reduction to be made in the weight of the vehicle's steering wheel and the steering column on which the inflator is mounted, providing a concurrent improvement in the "steerability" of the automobile.

In this regard, some recently introduced inflator devices utilize aluminum casing materials. The use of lighter materials such as aluminum in the construction of automobile air bag inflators, however, creates certain difficulties in that techniques need to be developed for rapidly connecting components formed of this material together in such a way as to ensure the formation of a seal therebetween which is capable of resisting the high internal pressures produced when the gas generant is ignited during the inflation cycle.

As noted above, there are in the prior art various devices which cause a protective bag to inflate in front of an automobile driver or passenger in the event of an accident to cushion the impact with the steering wheel, dashboard or other interior vehicle surface. Usually the device is activated by an inertial switch responsive to a primary crash impact. This inertial switch in turn causes an inflator apparatus to quickly inflate a collapsed bag into a protective position in front of the driver or passenger.

The inflating gas is generally supplied either from a source of compressed air or other compressed gas, such as shown in Chute, U.S. Pat. No. 3,411,808 and Wissing et al., U.S. Pat. No. 3,413,013, and a number of other patents in the crash restraint field. In several other prior art patents (e.g., U.S. Pat. Nos. 3,880,447 to Thorn et al.; 4,068,862 to Ishi et al.; 4,711,466 to Breed; and 4,547,342; 4,561,675 and 4,722,551 to Adams et al.), the bag is inflated by igniting a pyrotechnic propellant composition and directing the gaseous combustion products produced thereby directly into the bag.

The first technique discussed above for inflating an air bag requires a reservoir of gas stored at a very high pressure, which may be discharged into the bag as soon as an impact is sensed. In order to obtain a sufficient volume of gas for inflating a vehicle occupant restraint bag, however, a relatively large reservoir of gas, at pressures of 3000 psi or more is required. To open the gas reservoir in the very short time interval required for ensuring the safety of the vehicle occupants, explosive arrangements have been employed in the prior art for bursting a diaphragm or cutting through a structural portion of the reservoir. Such explosive arrangements have significant inherent safety problems, such as the production of shrapnel by the explosion, as well as the relatively high sound level reached within the passenger compartment due to the explosion. The psychological factor of having these explosives in each automobile also cannot be ignored.

The gas bottle (i.e., reservoir) technique for inflating an air bag also suffers from an additional disadvantage in that the gas pressure is highest at the commencement of bag deployment and decreases as a function of time as the gas in the storage reservoir is depleted. Moreover, the pressure/time history of such pressurized gas inflator devices is difficult if not impossible to control at reasonable cost and reliability. Further, the pressurized gas technique is undesirable since a minor leak can result in all of the gas being lost during the long period that the passenger restraint system may remain in the automobile prior to its deployment in a crash.

In addition, the adiabatic cooling of the gas as it expands from a storage condition of elevated pressure to the nearly ambient pressure of the inflatable bag reduces the effective volume of the gas available for inflating the bag. This cooling effect thus requires the manufacturer of the device to provide a total gas storage volume significantly greater than if the gas was initially stored at an elevated temperature.

The second technique discussed above employs a pyrotechnic gas generator having a rapidly burning propellant composition stored therein for producing substantial volumes of hot gaseous products which are then directed into the inflatable bag. Some compositions are available which produce a sufficiently low temperature combustion gas such that the gas may be directed substantially directly into the bag without danger to the vehicle's occupants. Other systems produce a high temperature combustion product requiring means for cooling the gas before it is introduced into the bag.

Many forms of gas generators or inflators utilizing combustible solid fuel gas generating compositions for the inflation of crash protection, i.e., "air bag", restraint systems are known in the prior art. Commonly encountered features among generators utilized for this purpose include: (1) an outer metal housing, (2) a gas generant composition located within the housing, (3) means to ignite the gas generant responsive to a signal received from a sensor positioned at a location removed from the inflator, and (4) means to filter and to cool the gas, positioned between the propellant composition and a plurality of gas discharge orifices defined by the generator housing.

One such gas generator includes an annular combustion chamber which is bounded by a welded outer casing or housing structure. The combustion chamber encloses a rupturable container or cartridge that is hermetically sealed and which contains a solid gas generant in pelletized form, surrounded by an annular filter assembly. The device further includes a central ignition or initiator zone and a toroidal filter chamber adjoining and encircling the combustion chamber. An inner casing or housing structure is located in close surrounding and supporting relationship to the rupturable container, the inner casing being formed by a cylinder having uniformly spaced peripheral ports or orifices near one end. These orifices provide exit holes to facilitate the flow of gas from the combustion chamber.

Alternately, inflator devices are constructed comprising first and second structural components or shells, i.e., specifically, a first diffuser shell and a second base shell. Both shells are forged and heat treated, after which they undergo machining to obtain a proper fit therebetween.

The first structural component, i.e., the diffuser shell, comprises three integral concentric cylinders. These cylinders form the inner structural walls of the inflator and define chambers therein containing the solid gas generant, the ignition means and the filter assembly. The cylinder walls further define exit openings or ports for the passage of the gases between adjacent chambers and subsequently out of the inflator and into the protective air bag.

The second structural component, i.e., the base shell, is equipped with an initiator device, i.e., an electrical squib, for igniting the main propellant charge. A flange may also be provided around the outer periphery of the base shell for attaching an air bag thereto. The base shell further comprises three additional concentric mating surfaces corresponding to the concentric cylinders of the diffuser shell. The three concentric cylinders of the diffuser shell are thus mated to corresponding concentric mating surfaces located upon the base shell by a process such as inertia welding.

As noted above, gas filtratio systems are normally included within generators of the type described above, to cool the gas and to remove from the gas flow the particulate products produced as a result of the combustion of the pyrotechnic material. Filters included in prior art gas generators of the type described above ordinarily comprise a series of zones or chambers containing layers of metal screen material having a variety of mesh sizes and/or one or more layers of an inert fiber. These filter components are typically separated from the central combustion chamber by thick support walls, which are required in this type of generator construction to withstand the elevated pressures produced during the ignition and combustion of the gas generant. A plurality of openings or ports are provided in these walls, through which the gas must pass in order to reach the filtration zone. Moreover, some sort of clip or pedestal arrangement within the filtration zone is normally required to maintain the plurality of screens, pads, etc. in proper position and alignment.

Gas generators must withstand enormous thermal and mechanical stresses for a short period during the gas generation process. Thus, many of the inflators that have been and are currently being used with automobile air bag devices are fabricated using heavy gauge steel for the casing and other structural housing components, with these components being joined together by, for example, screw threads, crimping or welding. More specifically, each of the gas generator units presently in commercial production is assembled and sealed with, for example, the use of some form of welding technique, such as inertia welding or electron beam welding.

SUMMARY OF THE INVENTION

It is thus an object of the present invention to provide a simplified inflator apparatus comprised of a minimum number of inexpensive components which are adapted to facilitate rapid robotic assembly.

It is a further object of the invention to provide an inflator constructed of a durable lightweight material such as aluminum, titanium or certain stainless steels in order to reduce the weight of the device in comparison to models currently produced using heavy steel components.

Another object of the present invention is to provide an inflator device having a reduced diameter due to the utilization of a unique dome-shaped housing configuration so as to maximize the available unused spaced within the automobile steering apparatus.

It is a still further object of the present invention to provide a gas generator for inflating an automobile passive restraint "air bag" device wherein the generator housing is structurally sealed by rolling a lower lip portion of the diffuser over the outer peripheral edge of the closure member mated therewith for sealing the open end of the diffuser, without the need for welding these components together. This obviates the attendant time-consuming and expensive inspection procedures currently required to determine the integrity of such welds.

The present invention thus comprises a sealed inflator, i.e., gas generator, apparatus adapted for providing a sufficient amount of a gaseous product by the combustion of a pyrotechnic composition stored within the housing thereof for substantially inflating an automobile air device in an interval of between about 30–60 milliseconds. This period approximates the time between the occurrence of a primary collision between the vehicle and, for example, a second car and a secondary collision occurring between the occupants of the automobile and the interior surfaces thereof, which occurs as a direct result of the primary collision.

The subject inflator apparatus is comprised of a small number, i.e., six, component parts in comparison to other prior art devices utilized for the same purpose which can contain on the order of about 15–30 parts. These components include: (1) a domed diffuser shell which is open at one end; (2) a flat closure member sealing the open end of the diffuser shell, (3) an annular filter assembly unit positioned within the diffuser adjacent an inner surface thereof; (4) a propellant assembly positioned within the cavity formed by the filter assembly, (5) an initiator device, i.e., an electrically actuated squib, for initiating combustion of the propellant assembly, and (6) a metal locking ring configured to maintain a rolled lip portion of the diffuser member in position against the outer peripheral edge of the closure member.

The initiating squib is normally connected to one or more remote sensors located upon the body portion of the vehicle, which are adapted for sensing a primary impact and signalling the occurrence of the collision to the squib, thus initiating a chain of combustion reactions which culminates in the inflation and deployment within the vehicle of a protective air bag. That is, upon actuation of the sensor, the propellant in the squib is ignited which, in turn, sets off an "enhancer" packet of a relatively fast-burning propellant composition (e.g. $BKNO_3$), optionally combined with an auto-ignition material, which produces sufficient heat to ignite the main propellant charge. The gaseous combustion products produced by this reaction are subsequently filtered and cooled and directed into the air bag.

Construction of the present inflator device comprises, as a first step, lowering a pre-fabricated annular filter assembly into the open end of the domed diffuser member. The propellant assembly is then lowered into the cavity defined by the filter assembly. The closure member is subsequently lowered into the open end of the diffuser and the lower lip of the former is then rolled over the outer peripheral edge of the latter by a rotating mechanical head to provide a structural seal therebetween.

DETAILED DESCRIPTION OF THE PREFERRED EMBODIMENTS

Figure 1:
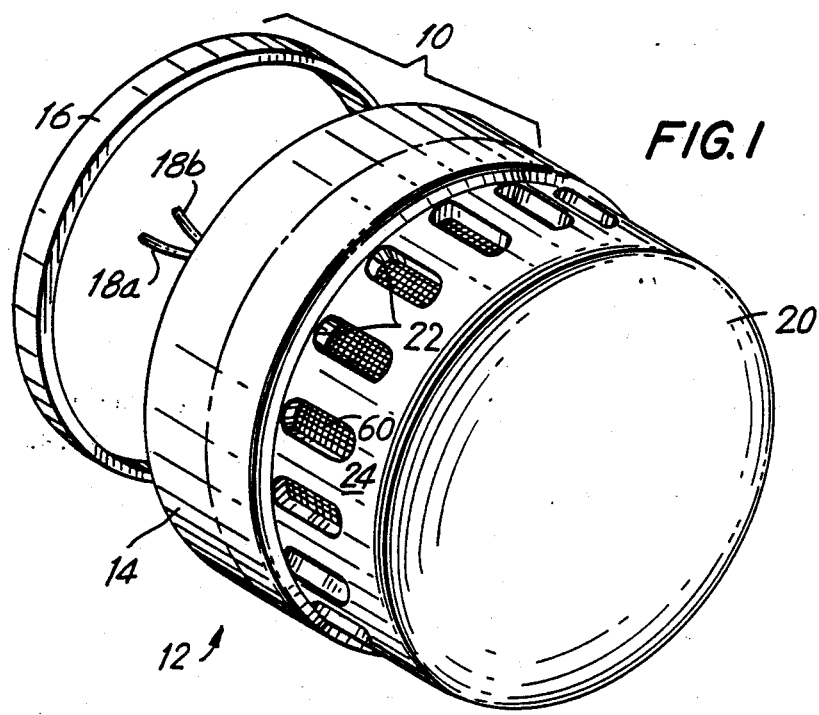
FIG. 1 is a perspective view of a partially assembled inflator apparatus constructed according to the present invention.

Referring initially to FIG. 1 there is illustrated a partially assembled air bag inflator apparatus 10. Inflator 10 is comprised of six main components, not all of which are visible in FIG. 1, which are designed and adapted for simple robotic assembly. These components include: (a) a domed diffuser member, which is open at one end; (b) a closure plate member configured to seal the open end of the diffuser, thus forming, with the diffuser, an inflator housing; (c) a measured quantity of a pyrotechnic propellant composition placed within the housing; (d) a filter assembly, also positioned within the inflator housing, outwardly adjacent the propellant composition, for cooling and filtering the gaseous products produced by the combustion of the propellant; (e) an igniter apparatus adapted to initiate combustion of the propellant, and (f) a locking ring configured to maintain a rolled lip portion of the diffuser member in position against a peripheral edge of the closure member when inflator 10 is activated, thus creating a seal between the diffuser and the closure plate member.

Of the elements described above, diffuser member 12 and locking ring 16, are clearly illustrated in FIG. 1. Ring 16 fits circumferentially within skirt portion 14 of diffuser member 12, after skirt 14 is rolled radially inwardly over the outer peripheral edge of closure plate member 15 by a rotating mechanical head. Also illustrated are electrical leads 18a, b which connect a remote sensing device (not shown), capable of sensing a primary impact between the automobile and another object, to the igniter, i.e., squib, apparatus, which ignites the main propellant composition in response to a signal from the remote sensor.

As illustrated in FIG. 1, the housing of inflator 10 is constructed in the form of a domed pressure vessel, since this design is well known among those of ordinary skill in the art as providing the optimum shape for containing a pressurized atmosphere, such as that which is produced when the propellant composition within the inflator housing is ignited. Moreover, this domed design also permits the use of an inflator having a smaller diameter than heretofore considered possible, without a concurrent need to thicken the inner support walls of the device, thus providing an apparatus having a lower weight than those currently available.

More specifically, FIG. 1 depicts diffuser 12, which forms an upper (i.e., closest to the driver) portion of the inflator housing. Diffuser 12 is closed at one end by a domed roof portion 20 whereas the opposite end, configured in the shape of an extended arcuate skirt 14, extends substantially perpendicularly to, roof portion 20, prior to assembly with closure plate member 15. The circumferential walls 24 of diffuser 12 further define a plurality of diffuser ports 22. Ports 22 are spaced equidistantly around wall 24 which defines the peripheral circumferential boundary of diffuser 12. Each diffuser port 22 communicates through outer wall 24 of diffuser 12 with combustion chamber within the inflator housing through an abutting annular filter assembly located within the housing (discussed below in detail) which is interposed therebetween.

One advantage of the present inflator configuration over existing inflators lies in the simplicity of its construction and the ease with which it may be assembled. In a first step, the filter ring assembly is simply lowered into position within diffuser 12 through the open end thereof. Next, the propellant is lowered into the cavity defined by the filter assembly. The closure member 15 (not shown) is then mated with the open end of diffuser 12 and sealed thereto by rolling the diffuser lip, i.e., skirt portion 14, over the edge of closure plate 15 such that diffuser skirt 14 is turned radially inwardly at an angle of substantially 180. to outer wall 24 by mechanical rolling means. Such rolling means are well known among those of ordinary skill in the art.

In the prior art, the diffuser/closure assembly process is normally carried out, as discussed above, by welding these two components together. This practice, however, necessitates the inclusion of thick, i.e., heavy, walls or support members within the interior of the generator housing, which are clearly unnecessary in the present device. In addition, a costly time-consuming inspection is also required to determine the integrity of every weld. This weld inspection step requires an expensive X-ray device and a trained operator to carry out these inspections. Applicant has therefore adopted the mechanical rolled lip seal described above which obviates the need for welding the housing of inflator 10.

Applicant's rolled lip arrangement also provides a much stronger seal than that obtained by merely crimping the metal parts together, a technique also extensively practiced in the prior art. This increased strength is due to the fact that applicant's rolled lip closure technique provides a continuous seal having a uniform strength, whereas crimping or petaling the metal edge of diffuser lip 14 over closure plate member 15 creates a discontinuous seal, varying in strength along its length, which is likely to open explosively when subjected to the effect of pressurized gasses attempting to escape from the inflator housing during activation of generator 10.

The inflator housing is preferably formed of parts constructed of a strong, lightweight metal, such as 201 or 301 stainless steel. Metals such as titanium may also be utilized, although the most preferred material, in view of cost, strength and ease of manufacture, is aluminum. One disadvantage with the use of the latter material, however, is that a seal between aluminum components (i.e., diffuser 12 and closure plate member 15) is not as strong as that produced between materials having a higher tensile strength, such as the aforementioned stainless steel.

Applicant thus utilizes locking ring 16 with inflator 10 to ensure the integrity of the seal when aluminum components are used to form the inflator housing. Ring 16 is pressed into the inner periphery of rolled lip 14 to prevent it from unrolling when inflator 10 is fired. Moreover, ring 16 is configured to have a narrow V-shaped groove (see, e.g., FIG. 4) adapted to snap over an outer edge of lip 14 when ring 16 is pressed downwardly toward closure plate member 15. Applicant has determined, however, that ring 16, although useful in forming a tight structural seal with aluminum components, is not required in order to permit inflator 10 to operate, even when the housing thereof is constructed of aluminum. Thus, although ring 16 is not required, it has been added to the device by applicant as a redundant safety feature. Ring 16 may also be used with steel and/or titanium inflators as well for the same purpose.

Furthermore, with the use of the presently described rolled lip process for sealing the inflator housing, there is no longer any necessity to utilize back-up sealing means for inflator 10 such as are often employed in the prior art. Such means include crimping or riveting the diffuser and the closure to ensure a tight seal between these components. Thus, applicant's rolled lip sealing technique results in a further saving in both time and energy as well as in parts costs. Moreover, the application of the presently described assembly process also permits the use of inexpensive forged metal parts rather than more expensive machined components for both diffuser 12 and closure member 15.

Figure 2:
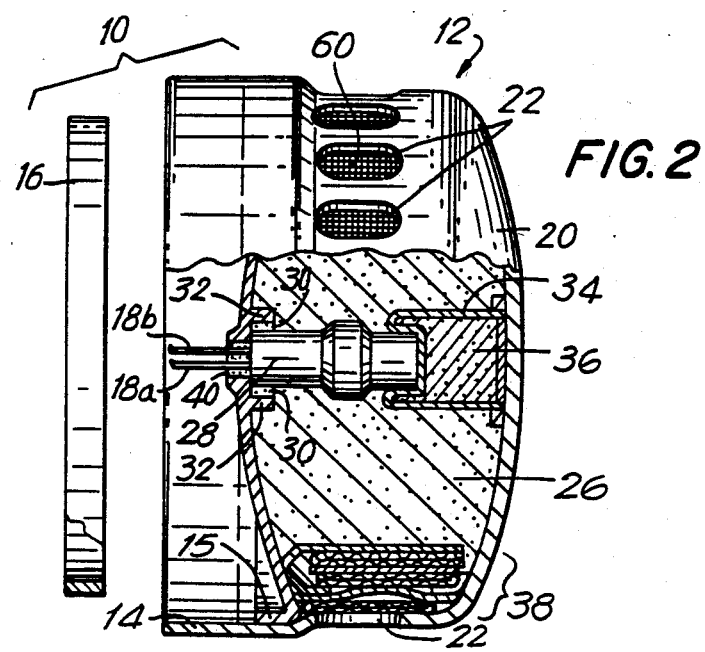
FIG. 2 is a side elevation view, partially in section, of the partially assembled inflator apparatus of FIG. 1.

FIG. 2 illustrates a transverse sectional view through inflator 10, depicting the internal features of the unit. Among the aspects illustrated in FIG. 2 is the combustion initiating means by which the ignition of pyrotechnic gas generating composition 26 is commenced. The initiating means preferably comprises an electrically activated squib 28, which contains a small charge of an electrically ignitable combustible material. Squib 28 is connected by leads 18a,b to at least one remote sensing device (not shown), of a type well-known in the art. Such sensing devices may be located, for example, in the front bumper and/or, side fenders of the automobile.

Within inflator 10, squib 28 may, for example, be threaded through an aperture 40 defined by closure member 15. In the preferred method, it may be "potted", i.e. glued, within aperture 40 by the use of an epoxy 30. Squib 28 is positioned within inflator 10 between two shoulders 32 formed by the surface of closure 15. Leads 18a,b extend outwardly from inflator 10 through aperture 40 to connect with one or more remote sensing devices described above.

In the interior of the inflator housing, an upper portion of squib 28 abuts against enhancer packet 34, containing a quantity of a gas-generating material such as mixture of boron and potassium nitrate, i.e., $BKNO_3$ 36, which is preferably employed in powdered form to provide the maximum available burning surface for the fastest possible response. Other rapidly combustible materials known to those skilled in the art may also be utilized for the same purpose but applicant has consistently obtained favorable results with the use of $BKNO_3$. In operation, upon an electrical signal from one or more of the remote sensors (not shown), the resultant discharge heats a wire strand (not shown) within squib 28. The heated wire ignites a propellant charge within the body of squib 28. A stream of hot gasses produced by this combustion is then directed into enhancer packet 34 due to the orientation of squib 28, whereupon the powdered BKNO$_3$ mixture 36 begins to burn.

However, while BKNO$_3$ 36 is very successful in igniting the main propellant charge 26, it suffers from a serious deficiency in that the autoignition temperature of this material is extremely high, i.e., from about 600°-700° F. Since the compositions chosen for main propellant charge 26 of inflator 10 ignite at an even higher temperature in the conditions normally encountered in, for example, a car fire, the BKNO$_3$ within the unit would be at a temperature in excess of 600° F. before ignition would take place.

In such a situation, the generator housing would be subjected to even higher temperatures, i.e., in the range of from 800°-900° F., and main propellant charge 26 would also be at a high temperature, perhaps 400°-500° F. Under these conditions, as controlled by laws of temperature and pressure well known to those skilled in the propellant art, propellant charge 26 would burn very rapidly and generate gas at extremely high pressure, thus creating a situation wherein an explosive fragmentation of the weakened generator housing (i.e., due to softening by the heat) becomes a distinct possibility.

It is therefore preferable to incorporate an autoignition material with BKNO$_3$ 36 within enhancer packet 34. This material is capable of autoignition at a lower temperature than BKNO$_3$ and its use thus results in an ignition of main propellant charge 26 while this charge is at a much lower temperature than that described above. Thus, main propellant charge 26 burns at a much lower rate and produces gas at a significantly lower pressure.

This additional "auto ignition" material is preferably a stabilized nitrocellulose composition such as IMR 4895 which autoignites at a temperature of less than about 400° F. The preferred material is produced by the DuPont Corporation, but any combustible material capable of performing in this manner would be acceptable for use in the present invention.

The ultimate effect of combining such an autoignition material with, for example, a BKNO$_3$ enhancer composition, so as to render this mixture an integral part of the ignition chain, is that the generator housing does not become weakened due to a high temperature environment prior to ignition of propellant 26, thus diminishing or altogether removing the chance of an explosive overpressurization. This removes one potential danger to passengers and/or bystanders in the event of a fire involving an automobile equipped with applicant's inflator device 10.

The rapid generation of hot gasses produced by the combustion of the BKNO$_3$/auto-ignition composition mixture acts to burst the walls of enhancer packet 34 and permits the gas to impinge upon main propellant composition 26, preferably comprising a mixture of sodium azide and at least a stoichiometric amount of a metal oxide such as copper oxide. A variety of compositions, well known to those of ordinary skill in the art, may be utilized as the main propellant charge 26 for inflator 10 described herein.

Applicant prefers, in the presently described generator, to use the various compositions described in U.S. Pat. No. 3,895,098 to John F. Pietz, issued July 15, 1975 and reissued Jan. 26, 1988 as Re. 32,584, entitled METHOD AND COMPOSITION FOR GENERATING NITROGEN GAS. The disclosure of this patent is therefore incorporated herein by reference. Among the propellant compositions disclosed in the subject patent are those which comprise a mixture of sodium azide with a stoichiometric amount of copper oxide which, as noted above, is preferred.

Alternatively, compositions substituting nickel and iron based oxidizers may be utilized, but these materials, although capable of a slightly higher effective gas output than the CuO/NaN$_3$ mixture described above, often require the addition of an ammonium perchlorate burn rate enhancer to reach their full potential, as disclosed in U.S. Pat. No. 4,604,151 issued on May 8, 1986 to Gregory Knowlton and John Pietz. This patent, which is entitled METHOD AND COMPOSITION FOR GENERATING NITROGEN GAS INCLUDING AMMONIUM PERCHLORATE CATALYST, is also incorporated herein by reference. Since, however, a large number of different pyrotechnic compositions are operable within inflator 10, the present invention should not be limited solely to the compositions disclosed above.

In the preferred embodiment of the present invention, main propellant mixture 26 is formed into small pellets, approximately the size of aspirin tablets. An appropriate amount of these pellets, calculated to produce a sufficient amount of gaseous combustion product to inflate an attached air bag within 30-60 milliseconds, is enclosed within either a sealed plastic bag, closed with the use of either a heat sealing device or an adhesive material, or alternatively, a foil packet, closed and sealed in the same manner as the plastic bag, and placed in diffuser 12 within the propellant cavity defined by filter assembly 38.

In an alternate embodiment of the invention, the propellant composition is molded or extruded into a single porous grain which may be conformed to the size and shape of the propellant cavity. An important consideration with the use of such a grain, however, is to ensure that it has a sufficient degree of porosity so as to provide a burning surface of sufficient dimension to permit the flame front to advance through the grain with enough speed to provide, within a 30-60 millisecond period, a volume of gas sufficient to inflate the air bag. Such a grain is disclosed and claimed in U.S. Pat. No. 4,758,287 issued July 19, 1988 to John Pietz and entitled POROUS PROPELLANT GRAIN AND METHOD OF MAKING SAME, the disclosure of which is also incorporated herein by reference.

The plastic or foil container used to hold the propellant mixture facilitates assembly of the inflator 10 by providing a convenient pre-weighed package adapted for simple robotic insertion into the inflator housing. Moreover, the thin outer packaging creates no hindrance to the rapid expansion of the gasses produced by combustion of propellant 26, i.e., the package is simply blown open by the gas as the propellant is consumed.

As the gas is produced due to the combustion of propellant 26, it travels in a tortuous path through filter assembly 38, wherein it is cooled and substantially all of the molten particulates are removed, prior to exiting through diffuser ports 22 and entering the air bag (not shown). As a result of following this tortuous path, there is no need to prefilter the gas prior to its passage through filter assembly 38, such as must be done in many prior art inflators.

It can also be seen from FIG. 2 that annular filter assembly 38 is configured and positioned so that, when inflator 10 is fired, filter 38 becomes wedged between diffuser 12 and closure member 15. That is to say that filter assembly 38 is configured on its upper and lower surfaces, respectively, to extend outwardly at an angle of about 1½° greater than the internal contact angles with corresponding diffuser 12 and closure 15 members. This creates a circular line contact between filter assembly 38 and diffuser 12 (along an upper surface) and with closure member 15 (on a lower surface) around the entire circumference of filter 38. When inflator 10 senses the internal pressures created by the combustion of propellant composition 26, filter assembly 38 is forced outwardly due to hoop stresses produced by the combustion, into the wedged portion of inflator 10, so as to enhance the seal around the edges of filter assembly 38. A tight seal is thus created which prevents the gas produced by the combustion of pyrotechnic mixture 26 from moving in any direction but through filter 38.

Figure 3:
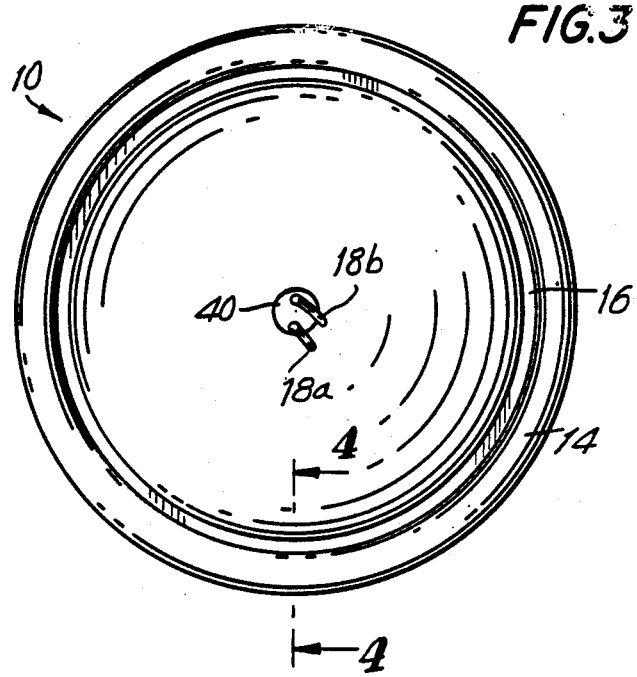
FIG. 3 is a bottom plan view of applicant's fully assembled inflator apparatus.

FIG. 3 is a bottom plan view of inflator 10, illustrating skirt portion 14 of diffuser 12 as it appears after being rolled over the outer peripheral edge of closure plate member 15 so as to form a sealing lip. This lip prevents the gasses produced by the combustion of main propellant charge 26 from traveling out of inflator 10 through any outlet other than diffuser ports 22. Additionally, as noted above, leads 18a,b from squib 28 extend outwardly through aperture 40 and communicate to a remote impact sensor (not shown) located elsewhere on the vehicle.

Figure 4:
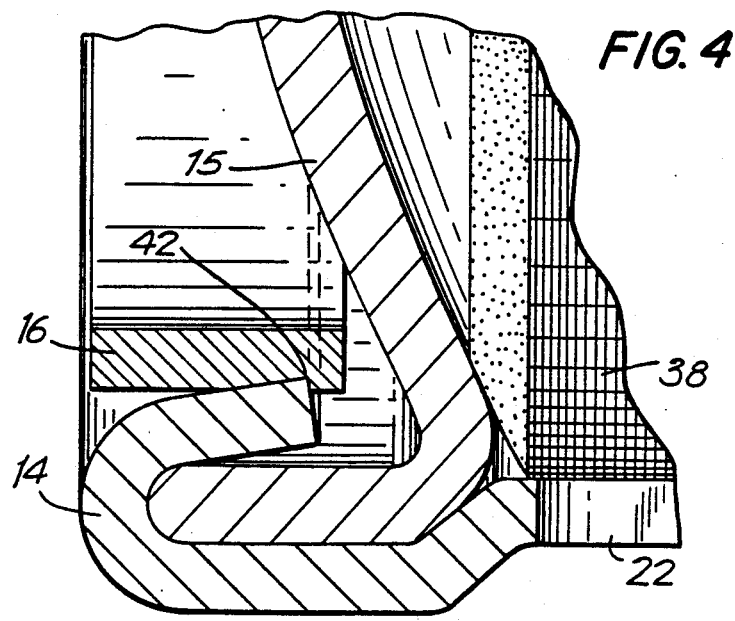
FIG. 4 is a partial sectional view of a portion of the rolled spun lip arrangement relied upon for sealing applicant's inflator apparatus.

FIG. 4 is a close-up view of the rolled lip arrangement for sealing inflator 10. The rolled lip is formed, as described above, with the use of a rotating mechanical head (not shown) which gradually forces skirt portion 14 radially downwardly over the outer peripheral edge of closure plate member 15 at an angle of about 180° to wall 24 of diffuser 12, so as to provide a sufficiently strong seal between the subject inflator components without the need for welding. Such a rolled seal is much stronger than that obtainable by simply crimping the material together since a crimp would not be continuous (as is the rolled lip) and further, the crimping operation would subject the metal parts to competing stresses (not produced in the presently described sealing process) which may actually cause cracking of the metal parts, thus negating the effect of the intended seal.

The rolled lip alone will provide a sufficiently strong seal when inflator 10 is constructed of a relatively strong metal, such as 201 or 301 stainless steel. However, as noted above, in instances when the device is constructed of a material having less tensile strength than stainless steel, e.g., aluminum, applicant has added locking ring 16 to increase the safety factor of the seal. Ring 16 is present solely as a precaution, however, since previous experimental trials have demonstrated that the rolled lip will remain sealed even in the event that inflator 10 is manufactured of aluminum or some other lightweight material. Ring 16 is further provided on its outer peripheral surface with a grooved portion configured and adapted for locking engagement with a terminal edge portion of skirt 14 when it is bent over closure member 15 to form the sealing lip. This arrangement ensures that skirt portion 14 will not escape the grip of locking ring 16 and thus the lip will not unroll during combustion of gas generant 26 when inflator 10 is actuated.

Figure 5:
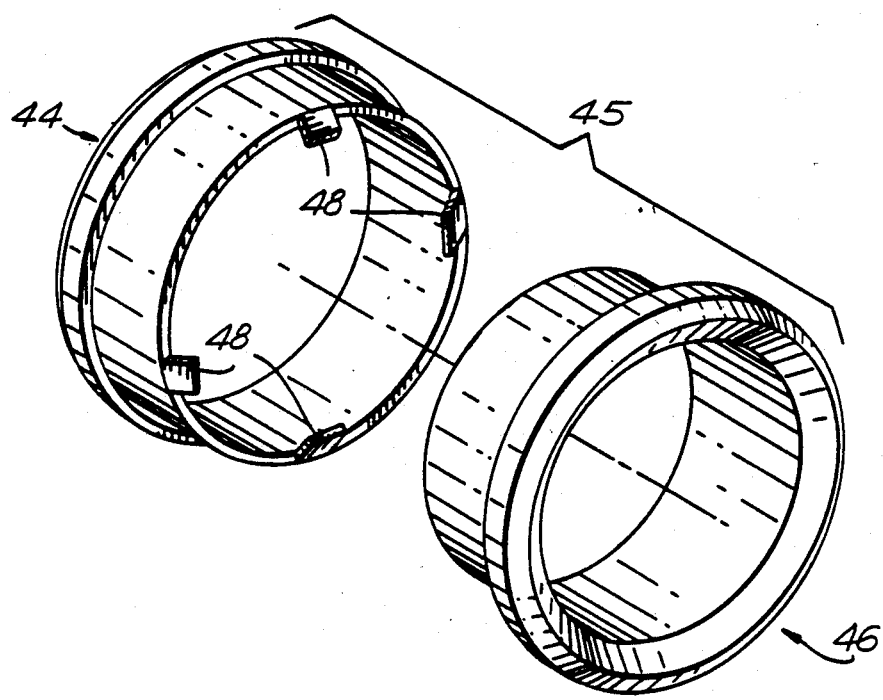
FIG. 5 is an exploded view of a frame portion of a filter assembly for use with the inflator of FIG. 1.

FIG. 5 illustrates members 44, 46 which interlock to form frame 45 for filter assembly 38. Members 44, 46 are preferably fabricated from sheet metal (e.g., aluminum) stampings in order to reduce the total weight of inflator 10. Tabs 48 serve as spacers to maintain a degree of separation between frame members 44, 46 sufficient to permit the arrangement therebetween of various filtering elements, described below, which serve to filter the particulates from the gaseous product produced as a result of the combustion of propellant 26. Filter 38 additionally absorbs some of the heat from the gas so as to cool it to a temperature approaching ambient. This prevents the impingement of hot gasses and molten particulates directly against the inner surface of the bag, which would likely lead to a failure of the bag during the inflation cycle.

Figure 6:
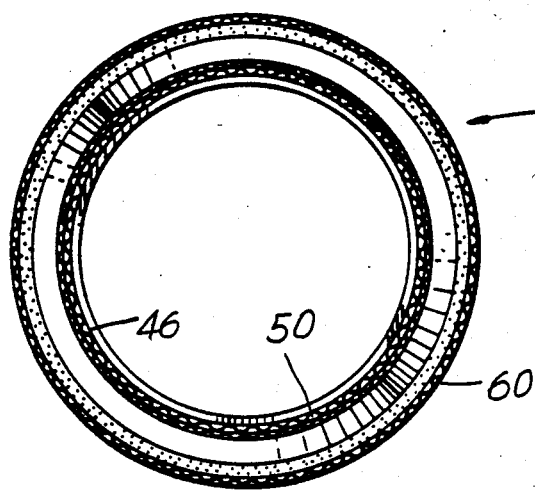
FIG. 6 is a top plan view of the subject filter assembly.

FIG. 6 is a top plan view of filter assembly 38 as it is oriented within the housing of inflator 10 when mounted upon an automobile steering column. This illustrates the appearance of filter assembly 38 when frame members 44, 46 are snapped together to form frame 45 and the filtration layers, comprising, for example, coarse slag screen, fine screen and inert ceramic fiber are wound therearound. The assembly is preferably held together by Welding the outermost screen layer to both frame members, 44, 46, i.e., at the outer periphery of the frame, but alternate methods utilizing, for example, fastening means or adhesives, may also be utilized.

Figure 7:
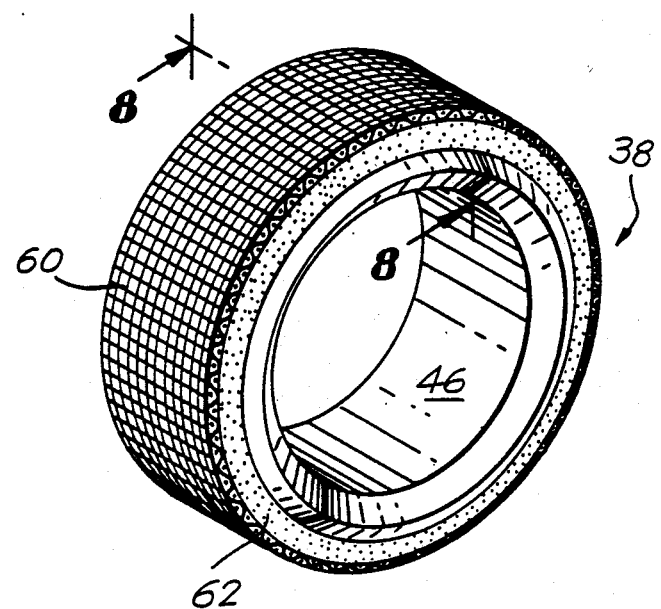
FIG. 7 is a perspective view of the filter assembly of FIG. 6.

FIG. 7 is a view of filter assembly 38 in perspective, further illustrating the annular arrangement of this component. The outermost layer of screen material 60, comprising a fine (e.g., 28 mesh) screen, which, when filter assembly 38 is in position within inflator 10, abuts against the inside of diffuser ports 22, may be clearly seen. The remaining layers, comprising screens having various mesh sizes and inert fiber pads, lie directly underneath layer 60 in a doughnut shaped arrangement. The preferred method of sealing assembly 38 together, i.e., by weld 62, may also be clearly seen. Weld 62 continues completely around both the top and bottom edges of filter assembly 38 to ensure that the components are securely sealed to frame members 44, 46 and to prevent disassembly as a result of the tremendous pressures exerted during ignition of propellant composition 26.

Figure 8:
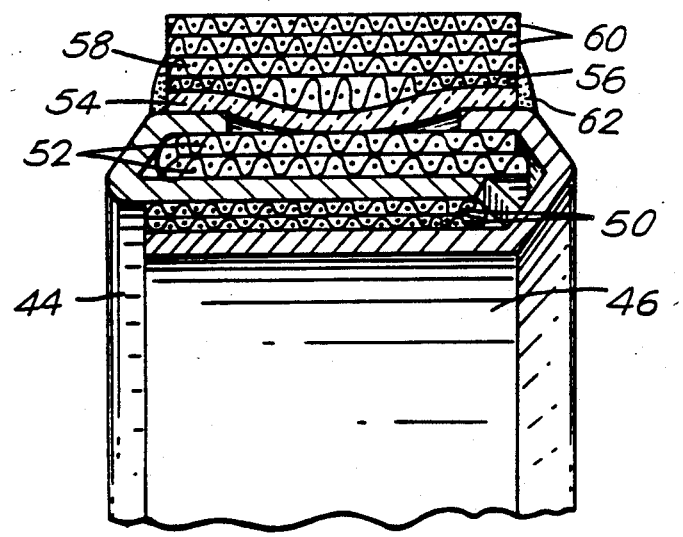
FIG. 8 is a sectional view taken along the line 8—8 of FIG. 7

FIG. 8 depicts a lateral cross-sectional view taken through filter assembly 38, illustrating the filter layers. Viewing the assembly from (inner) frame member 46 toward outer member 48, the gas produced by the combustion of propellant 26 travels over the top of member 46 and down through slag (i.e., coarse) screens 50, around frame member 48, through slag screens 52, and thereafter through: (a) a first 100 micron screen 54; (b) fiberfrax ® pad 56; (c) a second 100 micron screen 58; and (d) two layers of fine 28 mesh screen 60. Upon exiting from this filter assembly, substantially all of the particulate material has been removed from and the gas has been cooled to substantially ambient approaching temperature. It is further apparent from this view that the filter layers become progressively finer as the gas travels outwardly through assembly 38 to ensure removal of even the finest particles.

While it is apparent that the invention herein disclosed is well calculated to fulfill the objectives stated above, it will be appreciated that numerous modifications and embodiments may be devised by those skilled in the art. It is intended that the appended claims cover all such modifications and embodiments as fall within the true spirit and scope of the present invention.

I claim:

1. A lightweight, non-welded inflator apparatus which comprises:
   (a) a domed diffuser member, having a first open end and a second closed end;
   (b) a closure plate member sealing the open end of said diffuser member, thereby forming an inflator housing;
   (c) a sufficient amount of a combustible gas generant material within an interior portion of said housing to produce, upon ignition thereof, a volume of a gaseous product sufficient to substantially inflate an automobile air bag within about 30–60 milliseconds;
   (d) means for initiating combustion of said gas generant material, said initiating means positioned within said housing adjacent said gas generant;
   (e) means within said housing for filtering said gaseous combustion product prior to its discharge from the inflator housing, said filtering means circumferentially surrounding said gas generant material adjacent an inner wall portion of said housing, and adapted for cooling said gas and removing substantially all particulate matter therefrom,
   said closure plate member and said domed diffuser member being sealed together without welding either of said members to form an inflator housing capable of withstanding elevated pressures produced by combustion of said gas generant material, and
   (f) means outside said housing for locking a peripheral circumferential skirt portion of said diffuser member at said open end against a bottom surface of said closure plate member to reinforce said non-welded seal between said closure plate member and said diffuser member.

2. The inflator apparatus of claim 1 wherein said peripheral circumferential skirt portion on said open end of said diffuser member is rolled radially inwardly over a corresponding peripheral circumferential edge of said closure plate member so as to form a rolled lip, said rolled lip creating a structural seal between said members.

3. The inflator apparatus of claim 2 wherein said skirt portion is rolled over said peripheral edge of said closure plate member at an angle of about 180° to a remaining lateral wall portion of said diffuser member.

4. The inflator apparatus of claim 3 wherein said locking means comprises a metal ring shaped member configured and adapted for snap-locking engagement with an inner edge portion of said rolled lip adjacent said closure plate member to prevent said lip from unrolling when said inflator is actuated.

5. The inflator apparatus of claim 4 wherein said ring shaped member further comprises a notched edge portion along an outer surface thereof, said notch configured for interlocking engagement with an outer terminal edge of said rolled lip to reinforce said seal between said diffuser member and said closure plate member.

6. The inflator apparatus of claim 1 wherein both said diffuser member and said closure member are fabricated from a relatively light-weight, corrosion resistant, high tensile strength material.

7. The inflator apparatus of claim 6 wherein said light-weight, corrosion resistant, high tensile strength material is selected from aluminum, titanium and stainless steel.

8. The inflator apparatus of claim 1 wherein said diffuser member comprises a plurality of diffuser ports spaced equidistantly around the lateral periphery of said diffuser, said ports providing fluid communication between a combustion cavity within said inflator housing and an interior portion of an automobile air bag operatively associated with said inflator so as to permit deployment of said air bag upon the combustion of said gas generant material.

9. The inflator apparatus of claim 8 wherein said filtration means is interposed between said combustion cavity and said plurality of diffuser ports to permit filtering and cooling of said gaseous product prior to the entry thereof into said automobile air bag.

10. The inflator apparatus of claim 1 wherein said combustion initiating means comprises an electrically actuated squib.

11. The inflator apparatus of claim 10 wherein said squib is operatively associated with at least one remote impact sensing means, said sensing means capable of determining the occurrence of a primary collision between an automobile in which it is installed and another object and producing a signal as a result thereof which acts to initiate combustion of said gas generant material.

12. The inflator apparatus of claim 11 wherein said squib is secured within said inflator housing by means selected from fastening means and adhesive means.

13. The inflator apparatus of claim 12 wherein said adhesive means is an epoxy composition.

14. A lightweight non-welded pyrotechnic gas-generating inflator apparatus which comprises:
   (a) a domed diffuser member having a first open end and a second closed end, said diffuser member comprising a plurality of diffuser ports spaced equidistantly around the lateral periphery thereof, said ports providing fluid communication between a combustion cavity defined within said inflator and an interior portion of an automobile air bag operatively associated therewith so as to permit the deployment of said air bag upon combustion of a pyrotechnic gas generant material located within said inflator;
   (b) a closure plate member sealing the open end of said diffuser member, thus forming an inflator housing;
   both said diffuser member and said closure plate member formed of a relatively lightweight, corrosion-resistant, high tensile strength material,
   (c) a sufficient amount of a combustible gas generant material located within the combustion cavity to produce, upon ignition thereof, a volume of a gaseous product sufficient to substantially inflate said automobile air bag within about 30–60 milliseconds;
   (d) an electrically actuated squib adhesively secured within said housing adjacent said gas generant, said squib operatively associated with at least one remote impact sensor capable of determining the occurrence of a primary collision between an automobile in which it is installed and another object and producing a signal as a result thereof which acts to initiate combustion of said gas generant material;
   (e) a filter assembly within said inflator housing, said assembly interposed between said gas generant material and said diffuser ports to permit filtering and cooling of said gaseous combustion products prior to the entry thereof into said automobile air bag, said open end of said diffuser member being rolled at an angle of about 180° over an outer peripheral edge portion of said closure plate member toward a bottom surface of said closure plate member to form a rolled lip, said rolled lip creating a structural seal between said members, and (f) a metal ring-shaped member adapted for snap-locking engagement with a terminal portion of said rolled lip against said bottom surface of said closure member, said locking member further comprising a notched edge portion along an outer surface thereof configured to engage at least an outer terminal end of said lip to reinforce said seal between said diffuser member and said closure plate member.

15. The inflator apparatus of claim 14 wherein said filter assembly comprises:
   (a) first and second ring-shaped members configured to form annular filter frame means, at least one of said ring-shaped members having at least one tab member formed integrally thereupon and extending outwardly therefrom toward said other ring-shaped member to maintain a predetermined spacing between said ring-shaped members upon the formation of said frame means; and
   (b) a plurality of filtration layers supported upon said filter frame means, each said filtration layer positioned so as to at least partially overlap a preceding underlying one of said filtration layers around an entire outer annular surface of said filter frame means,
   an entire upper and lower circumferential edge portion of both said first and said second ring-shaped members being adapted for obtaining a circular line contact with an inner portion of said inflator housing, said contact causing said filter assembly to be self-sealing against said inner housing portion as a result of outwardly directed hoop stresses produced thereupon by activation of said inflator, such that a gaseous combustion product produced thereby is prevented from bypassing said filter assembly and is therefore directed through said filtration means in a serpentine path so as to cool and filter said gas.

16. The filter assembly of claim 15 wherein said first and said second ring shaped members each comprise a metal stamping with a substantially straight wall portion having a first side and a second side and an angled flange portion, integrally formed with said first side, extending outwardly from said wall portion at an acute angle therefrom, said ring shaped members adapted for an interengaging fit therebetween to form said annular frame means.

17. The filter assembly of claim 16 wherein said angled flange portion of each said ring shaped member extends away from the corresponding straight wall portion thereof at an angle of about 1½° greater than an internal contact angle between said filter assembly and, respectively, said diffuser member and said closure plate member, such that said filter assembly is substantially wedged against said inner portion of the housing to provide a gas-tight seal therebetween upon activation of the inflator device.

18. The filter assembly of claim 15 wherein said filtration layers comprise at least two layers of a metal screen material, at least one of said screen layers having mesh size measurements different from at least one other of said screen layers, and at least one layer of an inert fibrous material.

19. The filter assembly of claim 18 wherein the mesh size measurements of said at least two layers of metal screen correspondingly decrease from an inner edge of said filter assembly adjacent said combustion cavity to an outer edge thereof abutting an inner wall portion of said inflator housing to ensure filtration of substantially all particulate material from said gaseous product produced upon activation of the inflator device.

20. The filter assembly of claim 18 wherein said inert fibrous material comprises at least one ceramic fiber pad, said pad interposed between at least two layers of said metal screen material.

21. The filter assembly of claim 20 wherein said ceramic fiber pad comprises a mixture of aluminum oxide and silicon oxide fibers.

22. The filter assembly of claim 15 wherein said layer of metal screen material adjacent said outer edge of said filter is secured along at least one edge thereof to a corresponding adjacent edge surface of said ring-shaped frame members by mechanical means or adhesive means to maintain said filtration layers in a predetermined arrangement.

23. The filter assembly of claim 22 wherein said mechanical means comprises a weld.

24. The filter assembly of claim 15 wherein said filter layers comprise, in order, from an inner edge of said filter, adjacent said combustion cavity to an outer edge of said filter abutting an inner wall portion of said inflator housing:
   (a) a first layer of coarse slag screen;
   (b) a second layer of coarse slag screen;
   (c) a third layer of a 100 micron screen;
   (d) a fourth layer of an inert ceramic pad;
   (e) a fifth layer of 100 mesh screen; and
   (f) a sixth layer of 28 mesh screen,
each said layer substantially overlaying each preceding layer and wherein said sixth layer of said 28 mesh screen is substantially secured to said annular filter frame means along a peripheral edge thereof to maintain said filter layers in a predetermined arrangement.

25. The inflator apparatus of claim 14 wherein said gas generant material within the combustion cavity of said inflator is discreetly packaged within container means.

26. The inflator apparatus of claim 25 wherein said container means comprises a sealed packet formed of a material selected from plastic and a metal foil.

27. The inflator apparatus of claim 26 wherein said packet is sealed by means selected from fastening means, adhesive means and heat sealing means.

28. The inflator apparatus of claim 14 wherein said gas generant material comprises an alkali metal or an alkaline earth metal azide and at least a stoichiometric amount of a metal oxide.

29. The inflator apparatus of claim 28 wherein said gas generant material comprises a mixture of sodium azide and at least a stoichiometric amount of copper oxide.

30. The inflator apparatus of claim 14 which further comprises means for enhancing the speed of combustion of said generant material.

31. The inflator apparatus of claim 30 wherein said combustion enhancing means comprises a separate enhancer packet located within said combustion cavity adjacent said squib, said enhancer packet containing a substantially homogeneous mixture of an ignition enhancing material and an auto-ignition composition.

32. The inflator apparatus of claim 31 wherein said ignition enhancing material comprises BKNO$_3$ and said auto-ignition material is a stabilized nitrocellulose composition.

33. The inflator apparatus of claim 14 wherein said gas generant material is present within said inflator housing in the form of a quantity of pressed tablets.

34. The inflator apparatus of claim 14 wherein said gas generant material is present within said inflator housing as a single porous propellant grain having a plurality of randomly oriented radially and longitudinally interconnected channels of various diameters extending entirely through said grain to increase the burning surface thereof.

35. A lightweight non-welded pyrotechnic gas-generating inflator apparatus which comprises:
   (a) a domed diffuser member having a first open end and a second closed end, said diffuser member comprising a plurality of diffuser ports spaced equidistantly around the lateral periphery thereof, said ports providing fluid communication between a combustion cavity defined within said inflator and an interior portion of an automobile air bag operatively associated with said inflator so as to permit the deployment of said air bag upon combustion of a pyrotechnic gas generant material stored within said inflator;
   (b) a closure plate member sealing the open end of said diffuser member, thus forming an inflator housing;
   wherein said open end of said diffuser member is rolled over an outer peripheral edge portion of said closure plate member at an angle of about 180° to a remaining lateral wall portion of said diffuser member toward a bottom surface of said closure plate member to form a rolled lip thereover, said rolled lip creating a structural seal between said diffuser member and said closure member, both said diffuser member and said closure plate member formed of a relatively lightweight, corrosion-resistant, high tensile strength material
   (c) a sufficient amount of a combustible gas generant material discreetly packaged within the combustion cavity to produce, upon ignition thereof, a volume of a gaseous product sufficient to substantially inflate said automobile air bag within about 30-60 milliseconds;
   (d) an electrically actuated squib adhesively secured within said housing, said squib operatively associated with at least one remote impact sensor capable of determining the occurrence of a primary collision between an automobile in which it is installed and another object and producing a signal as a result thereof which acts to initiate combustion of said gas generant material;
   (e) a filter assembly within said inflator housing, said assembly interposed between said gas generant material and said diffuser ports to permit filtering and cooling of said gaseous combustion products prior to the entry thereof into said automobile air bag, said filter assembly comprising
      (1) first and second ring-shaped members configured to form annular filter frame means, at least one of said ring-shaped members having at least one tab member formed integrally thereupon and extending outwardly therefrom toward said other ring-shaped member to maintain a predetermined spacing between said ring-shaped members upon the formation of said frame means; and
      (2) a plurality of filtration layers supported upon said filter frame means, each said filtration layer positioned so as to at least partially overlap a preceding underlying one of said filtration layers around an entire outer annular surface of said filter frame means,
   an entire upper and lower circumferential edge portion of both said first and said second ring-shaped members being adapted for obtaining a circular line contact with an inner portion of said inflator housing, thus causing said filter assembly to be self-sealing against said inner housing portion as a result of outwardly directed hoop stresses produced thereupon by activation of said inflator, such that a gaseous combustion product produced thereby is prevented from bypassing said filter assembly and is therefore directed through said filtration means in a serpentine path so as to cool and filter said gas, and
   (f) a ring-shaped member configured and adapted for snap-locking engagement with a terminal portion of said rolled lip against said bottom surface of said closure member, said locking member further comprising a notched edge portion along an outer surface thereof configured to engage at least an outer terminal end of said lip 36. A method for constructing a lightweight non-welded inflator apparatus for installation in an automobile passive safety device, said method comprising:
   (a) forging a diffuser member of a material which is relatively lightweight, corrosive resistant and having a high tensile strength, said diffuser member having a first domed end and a second open end;
   (b) lowering the filter assembly of claim 15 through said open end of said diffuser member and into position therein;
   (c) lowering a discreetly packaged propellant assembly into a combustion cavity within said diffuser member defined by said filter assembly;
   (d) forging a substantially flat closure plate member for sealing the open end of said diffuser member;
   (e) mating the closure plate member to the open end of the diffuser member;
   (f) rolling said open end of said diffuser member adjacent said closure plate member at an angle of about 180° over an outer peripheral edge portion of said closure plate member toward a bottom surface of said closure plate member to form a rolled lip thereover, said rolled lip forming a structural seal between said diffuser member and said closure member; and
   (g) locking a terminal portion of said rolled lip against said closure member to reinforce said seal between said members.

37. A lightweigth, non-welded inflator apparatus which comprises:
   (a) a domed diffuser member, having a first open end and a second closed end;
   (b) a closure plate member sealing the open end of said diffuser member, thereby forming an inflator housing;
   (c) a sufficient amount of a combustible gas generant material within an interior portion of siad housing to produce, upon ignition thereof, a volume of a gaseous product sufficient to substantially inflate an automobile air bag within about 30-60 miliiseconds;

(d) means for initiating combustion of said gas generant material, said initiating means positioned within said housing adjacent said gas generant;

(e) means within said housing for filtering said gaseous combustion product prior to its discharge from the inflator housing, siad filtering means circumferentially surrounding said gas generant material adjacent an inner wall portion of said housing, and adapted for cooling said gas and removing substantially all particulate matter therefrom, said open end of said diffuser member being rolled at an angle of about 180° over an outer peripheral edge portion of said closure plate member toward a bottom surface of said closure plate member to form a rolled lip, said rolled lip creating a non-welded structural seal between said members, and (f) means outside said housing locking a peripheral circumferential skirt portion of said diffuser member at said open end against a bottom surface of said closure plate member to reinforce said non-welded seal between said closure plate member and said diffuser member.

* * * * *